(12) United States Patent
Abraham et al.

(10) Patent No.: US 8,434,336 B2
(45) Date of Patent: May 7, 2013

(54) METHOD AND APPARATUS FOR MANAGING CLIENT INITIATED TRANSMISSIONS IN MULTIPLE-USER COMMUNICATION SCHEMES

(75) Inventors: Santosh Paul Abraham, San Diego, CA (US); Simone Merlin, San Diego, CA (US); Maarten Menzo Wentink, Naarden (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 12/780,690

(22) Filed: May 14, 2010

(65) Prior Publication Data

US 2011/0122805 A1 May 26, 2011

Related U.S. Application Data

(60) Provisional application No. 61/261,325, filed on Nov. 14, 2009.

(51) Int. Cl.
*H04L 12/413* (2006.01)
(52) U.S. Cl.
USPC .............................. 70/447; 370/431
(58) Field of Classification Search .................. 370/349, 370/431, 445, 447, 448, 461, 437, 459
See application file for complete search history.

(56) References Cited

U.S. PATENT DOCUMENTS

2010/0008318 A1* 1/2010 Wentink et al. ............... 370/329

FOREIGN PATENT DOCUMENTS

EP         1257140      11/2002
WO    WO2006016396 A1   2/2006

OTHER PUBLICATIONS

International Search Report and Written Opinion—PCT/US2010/056599, International Search Authority—European Patent Office—Feb. 14, 2011.
Universal Mobile Telecommunications System (UMTS); FDD enhanced uplink; Overall description; Stage 2 (3GPP TS 25.309 version 6.6.0 Release 6); ETSI TS 125 309, ETSI Standards, LIS, Sophia Antipolis Cedex, France, vol. 3-R2, No. V6.6.0, Mar. 1, 2006, XP014034283.

* cited by examiner

*Primary Examiner* — Brenda H Pham
(74) *Attorney, Agent, or Firm* — Dang M. Vo

(57) ABSTRACT

A method for wireless communications is disclosed that includes receiving a plurality of requests to transmit data from a plurality of apparatuses; determining resource allocation for a set of apparatuses in the plurality of apparatuses, wherein the determination is based on the plurality of requests; and transmitting a message comprising the resource allocation to the set of apparatuses to permit data transmission. Another method for wireless communications is disclosed that includes contending for access to a medium based on a request, by an apparatus, with a plurality of other apparatuses; receiving a message, the message comprising a resource allocation based on requests from the apparatus and the other apparatuses, wherein the resource allocation permits data transmission from the apparatus and some of the other apparatuses; and transmitting data by the apparatus based on the message. Apparatuses for performing the methods are also disclosed.

97 Claims, 9 Drawing Sheets

METHOD AND APPARATUS FOR MANAGING CLIENT INITIATED TRANSMISSIONS IN MULTIPLE-USER COMMUNICATION SCHEMES

CROSS-REFERENCE TO RELATED APPLICATIONS

Claim of Priority Under 35 U.S.C. §119

The present application for patent claims priority to Provisional Application No. 61/261,325, entitled "Method and Apparatus for Managing Client Initiated Uplink Transmissions in Multiple-User Communication Schemes" filed Nov. 14, 2009, and assigned to the assignee hereof and hereby expressly incorporated by reference herein.

BACKGROUND

I. Field

The following description relates generally to communication systems, and more particularly to a method and apparatus for managing client initiated transmissions in multiple-user communication schemes.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., and this will not cause significant interference and most likely be ignored. In order to form these orthogonal streams, the AP needs to have channel state information (CSI) from each of the receiving STAs. Although CSI can be measured and communicated in several ways, thereby adding complexity, the use of CSI will optimize the configuration of SDMA streams.

Additional complexities arise when MIMO is applied to multi-user (MU) systems. For example, typically, the AP controls the uplink (UL) communication process. However, in certain configurations, the uplink scheduling approach still requires that STAs contend with the AP for channel access. In other words, the AP will act as an additional STA trying to gain access to the transmission medium, thereby affecting all STAs attempting to gain access. Further, as the STAs rely on the AP for scheduling of future UL transmissions, the scheduling scheme does not always work well with certain types of data traffic, such as bursty data traffic.

Consequently, it would be desirable to address one or more of the deficiencies described above.

SUMMARY

The following presents a simplified summary of one or more aspects of a method and apparatus for method and apparatus for managing client initiated uplink transmissions in multiple-user communication schemes in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes receiving a plurality of requests to transmit data from a plurality of apparatuses; determining resource allocation for a set of apparatuses in the plurality of apparatuses, wherein the determination is based on the plurality of requests; and transmitting a message comprising the resource allocation to the set of apparatuses to permit data transmission.

In another aspect, an apparatus for wireless communications is provided that includes a processing system configured to receive a plurality of requests to transmit data from a plurality of apparatuses; determine resource allocation for a set of apparatuses in the plurality of apparatuses, wherein the determination is based on the plurality of requests; and transmit a message comprising the resource allocation to the set of apparatuses to permit data transmission.

In yet another aspect, an apparatus for wireless communications is provided that includes means for receiving a plurality of requests to transmit data from a plurality of apparatuses; means for determining resource allocation for a set of apparatuses in the plurality of apparatuses, wherein the determination is based on the plurality of requests; and means for transmitting a message comprising the resource allocation to the set of apparatuses to permit data transmission.

In yet another aspect, a computer-program product for wireless communications is provided that includes a machine-readable medium including instructions executable to receive a plurality of requests to transmit data from a plurality of apparatuses; determine resource allocation for a set of apparatuses in the plurality of apparatuses, wherein the determination is based on the plurality of requests; and transmit a message comprising the resource allocation to the set of apparatuses to permit data transmission.

In yet another aspect, an access point is provided that includes one or more antennas; a receiver configured to receive, via the one or more antennas, a plurality of requests to transmit data from a plurality of apparatuses; a processor configured to determine resource allocation for a set of apparatuses in the plurality of apparatuses, wherein the determination is based on the plurality of requests; and a transmitter transmit a message comprising the resource allocation to the set of apparatuses to permit data transmission.

In yet another aspect, a method for wireless communications is provided that includes contending for access to a medium based on a request, by an apparatus, with a plurality of other apparatuses; receiving a message, the message comprising a resource allocation based on requests from the apparatus and the other apparatuses, wherein the resource allocation permits data transmission from the apparatus and some of the other apparatuses; and transmitting data by the apparatus based on the message.

In yet another aspect, an apparatus for wireless communications is provided that includes a processing system configured to contend for access to a medium based on a request, by an apparatus, with a plurality of other apparatuses; receive a message, the message comprising a resource allocation based on requests from the apparatus and the other apparatuses, wherein the resource allocation permits data transmission from the apparatus and some of the other apparatuses; and transmit data by the apparatus based on the message.

In yet another aspect, an apparatus for wireless communications is provided that includes means for contending for access to a medium based on a request, by an apparatus, with a plurality of other apparatuses; means for receiving a message, the message comprising a resource allocation based on requests from the apparatus and the other apparatuses, wherein the resource allocation permits data transmission from the apparatus and some of the other apparatuses; and means for transmitting data by the apparatus based on the message.

In yet another aspect, a computer-program product for wireless communications is provided that includes a machine-readable medium including instructions executable to contend for access to a medium based on a request, by an apparatus, with a plurality of other apparatuses; receive a message, the message comprising a resource allocation based on requests from the apparatus and the other apparatuses, wherein the resource allocation permits data transmission from the apparatus and some of the other apparatuses; and transmit data by the apparatus based on the message.

In yet another aspect, a station is provided that includes an antenna; a processor, coupled to the antenna, configured to contend for access to a medium based on a request, by an apparatus, with a plurality of other apparatuses; a receiver configured to receive a message, the message comprising a resource allocation based on requests from the apparatus and the other apparatuses, wherein the resource allocation permits data transmission from the apparatus and some of the other apparatuses; and a transmitter configured to transmit data by the apparatus based on the message.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

BRIEF DESCRIPTION OF THE DRAWINGS

These and other sample aspects of the invention will be described in the detailed description that follow, and in the accompanying drawings, wherein.

Figure 1:
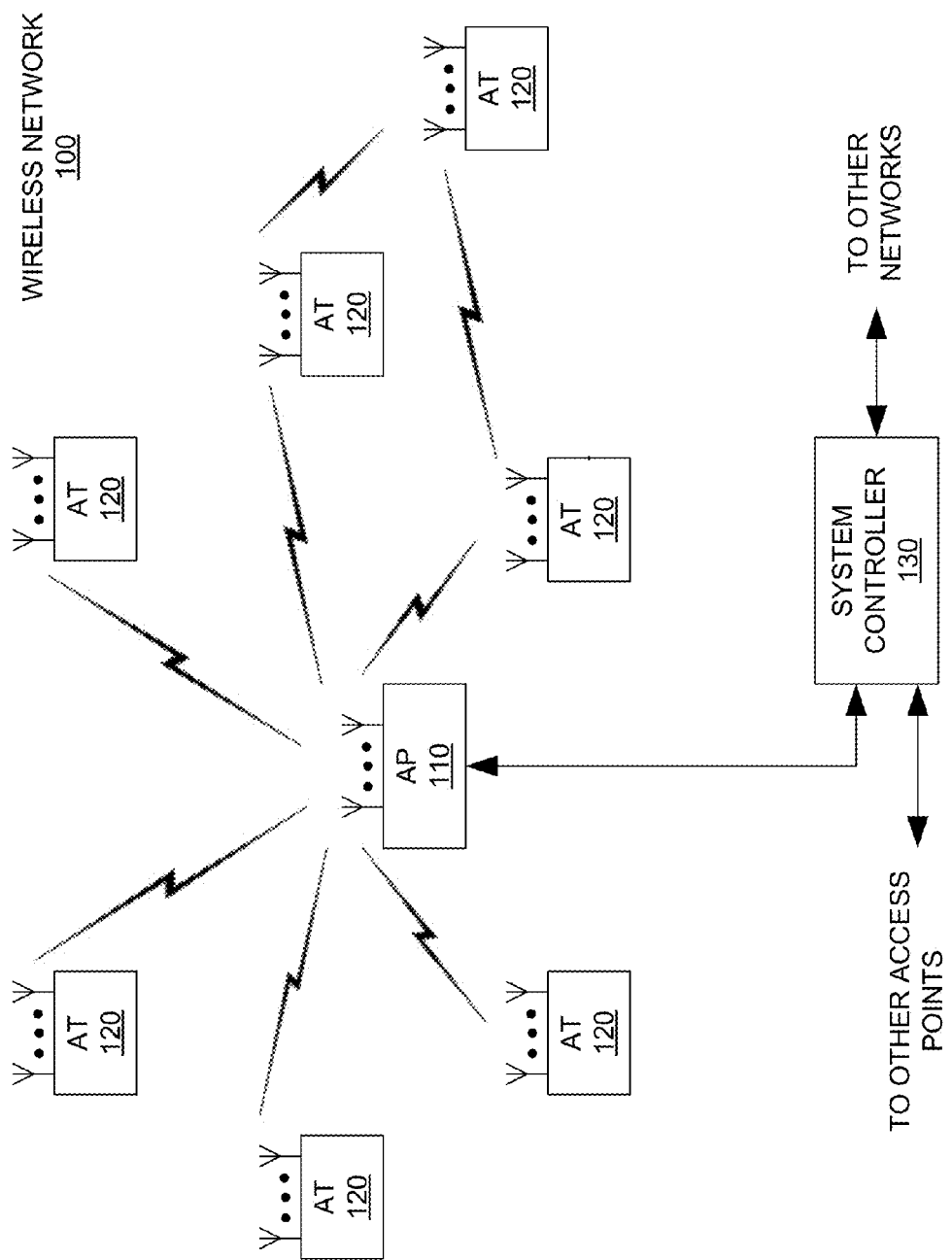
FIG. 1 is a diagram of a wireless communications network configured in accordance with an aspect of the disclosure.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Several aspects of a wireless network will now be presented with reference to FIG. 1. The wireless network 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

The MAC layer checks the error detection code for each MAC packet to determine whether it was successfully decoded. If the error detection code for a MAC packet indicates that it was successfully decoded, then the payload for the MAC packet is provided to the application layer. If the error detection code for a MAC packet indicates that it was unsuccessfully decoded, the MAC packet is discarded. A Block ACKnowledgement (BACK) may be sent back to the transmitting node indicating which data packets were successfully decoded. The transmitting node uses the BACK to determine which data packets, if any, require retransmission.

Figure 2:
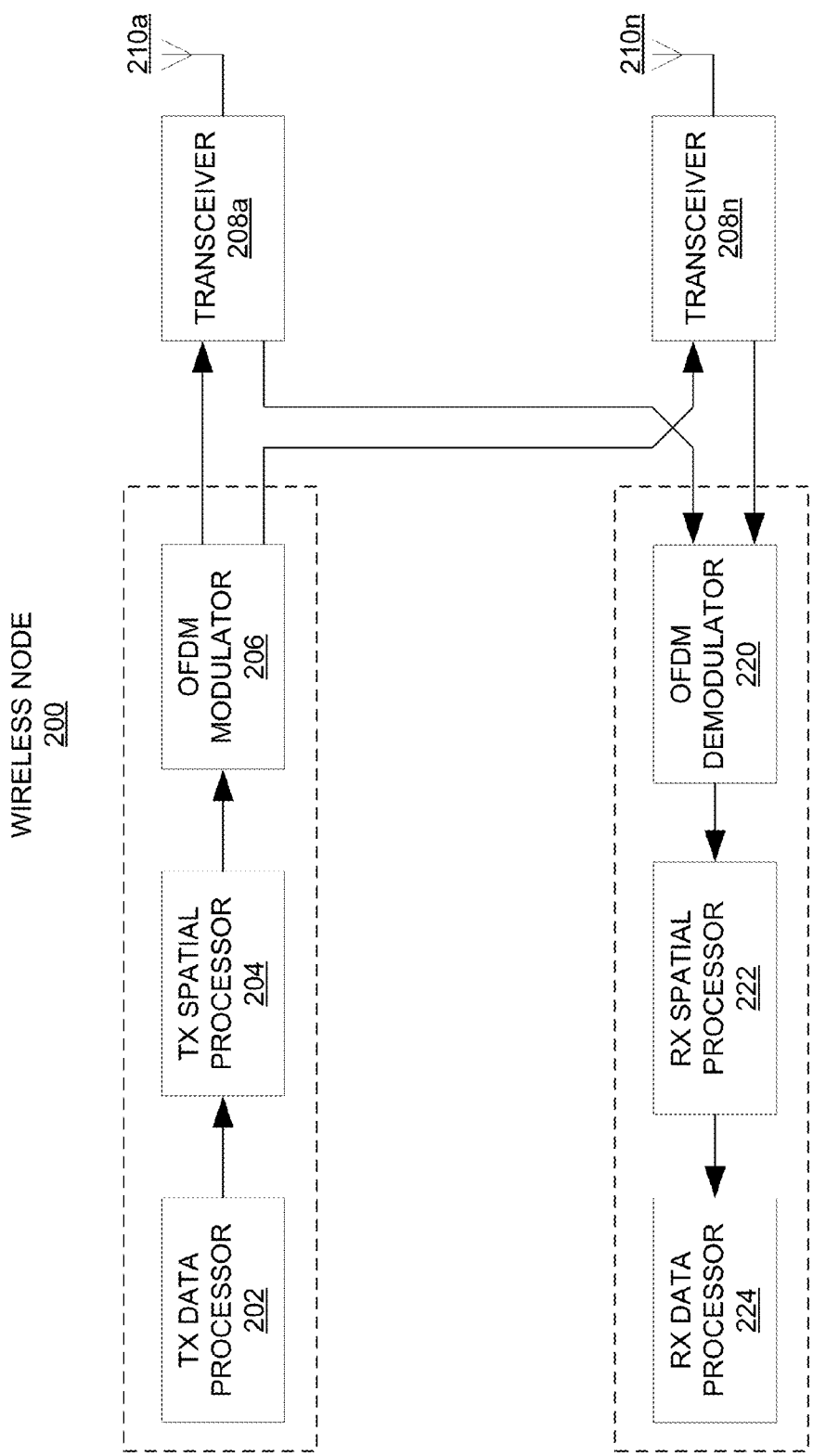
FIG. 2 is a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into parallel streams. Each stream is then mapped to an OFDM subcarrier and then combined using an Inverse Fast Fourier Transform (IFFT) to produce a TX spatial processor 204 that performs spatial processing of the modulation symbols. This may be accomplished by spatially precoding the modulation symbols before providing them to an OFDM modulator 206.

The OFDM modulator 206 splits the modulation symbols into parallel streams. Each stream is then mapped to an OFDM subcarrier and then combined together using an Inverse Fast Fourier Transform (IFFT) to produce a time domain OFDM stream. Each spatially precoded OFDM stream is then provided to a different antenna 210a-210n via a respective transceiver 208a-208n. Each transceiver 208a-208n modulates an RF carrier with a respective precoded stream for transmission over the wireless channel.

In a receive mode, each transceiver 208a-208n receives a signal through its respective antenna 210a-210n. Each transceiver 208a-208n may be used to recover the information modulated onto an RF carrier and provide the information to an OFDM demodulator 220.

The RX spatial processor 220 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

In wireless nodes implementing OFDM, the stream (or combined stream) from the transceiver 208a-208n is provided to an OFDM demodulator 220. The OFDM demodulator 220 converts the stream (or combined stream) from time-domain to the frequency domain using a Fast Fourier Transform (FFT). The frequency domain signal comprises a separate stream for each subcarrier of the OFDM signal. The OFDM demodulator 220 recovers the data (i.e., modulation symbols) carried on each subcarrier and multiplexes the data into a stream of modulation symbols before sending the stream to a RX spatial processor 222.

The RX spatial processor 222 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

A RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs in order to decode the data that was originally transmitted before providing the data to the MAC layer.

Figure 3:
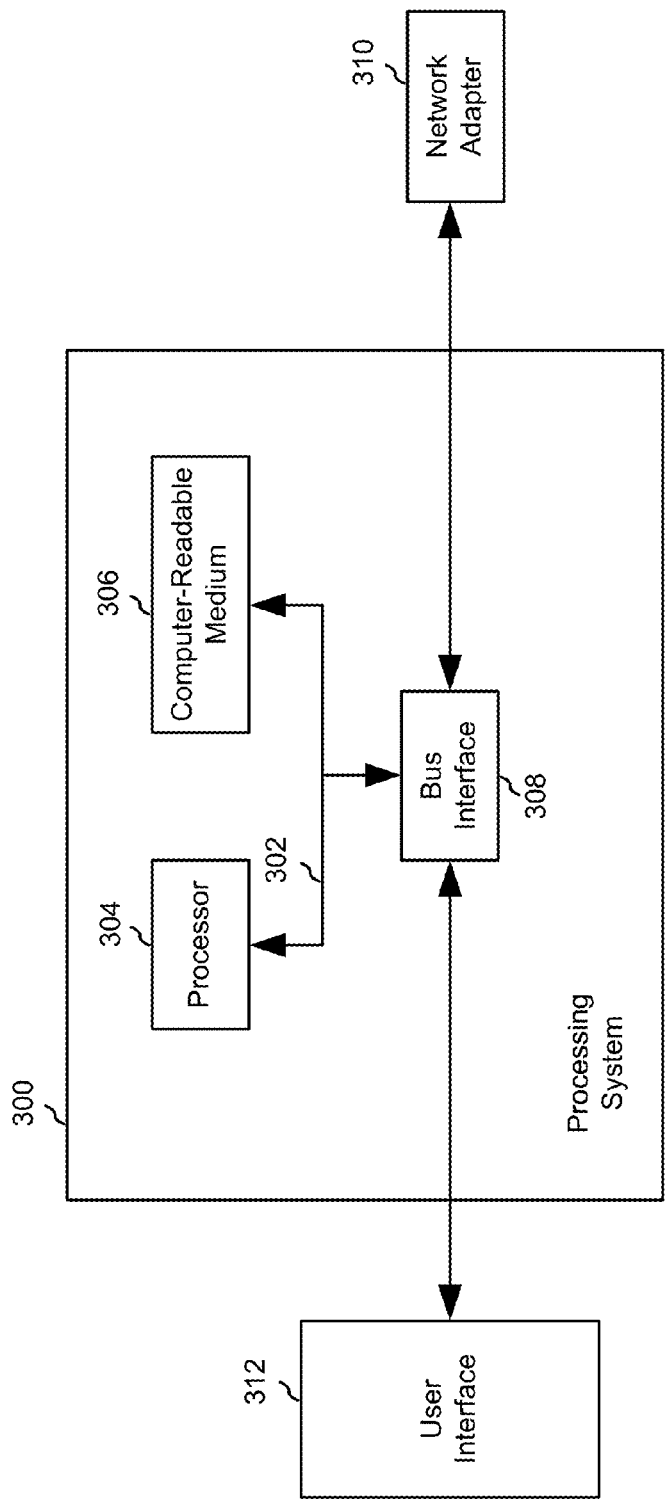
FIG. 3 is a block diagram of an apparatus that includes a processing system.

FIG. 3 illustrates an example of a hardware configuration for a processing system 300 in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, computer-readable media 306, and a bus interface 308. The bus interface 308 may be used to connect a network adapter 310, among other things, to the processing system 300 via the bus 302. The network interface 310 may be used to implement the signal processing functions of the PHY layer. In the case of an access terminal 110 (see FIG. 1), a user interface 312 (e.g., keypad, display, mouse, joystick, etc.) may also be connected to the bus via the bus interface 308. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the computer-readable media 308. The processor 308 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation illustrated in FIG. 3, the computer-readable media 306 is shown as part of the processing system 300 separate from the processor 304. However, as those skilled in the art will readily appreciate, the computer-readable media 306, or any portion thereof, may be external to the processing system 300. By way of example, the computer-readable media 306 may include a transmission line, a carrier wave modulated by data, and/or a computer product separate from the wireless node, all which may be accessed by the processor 304 through the bus interface 308. Alternatively, or in addition to, the computer readable media 304, or any portion thereof, may be integrated into the processor 304, such as the case may be with cache and/or general register files.

Figure 4:
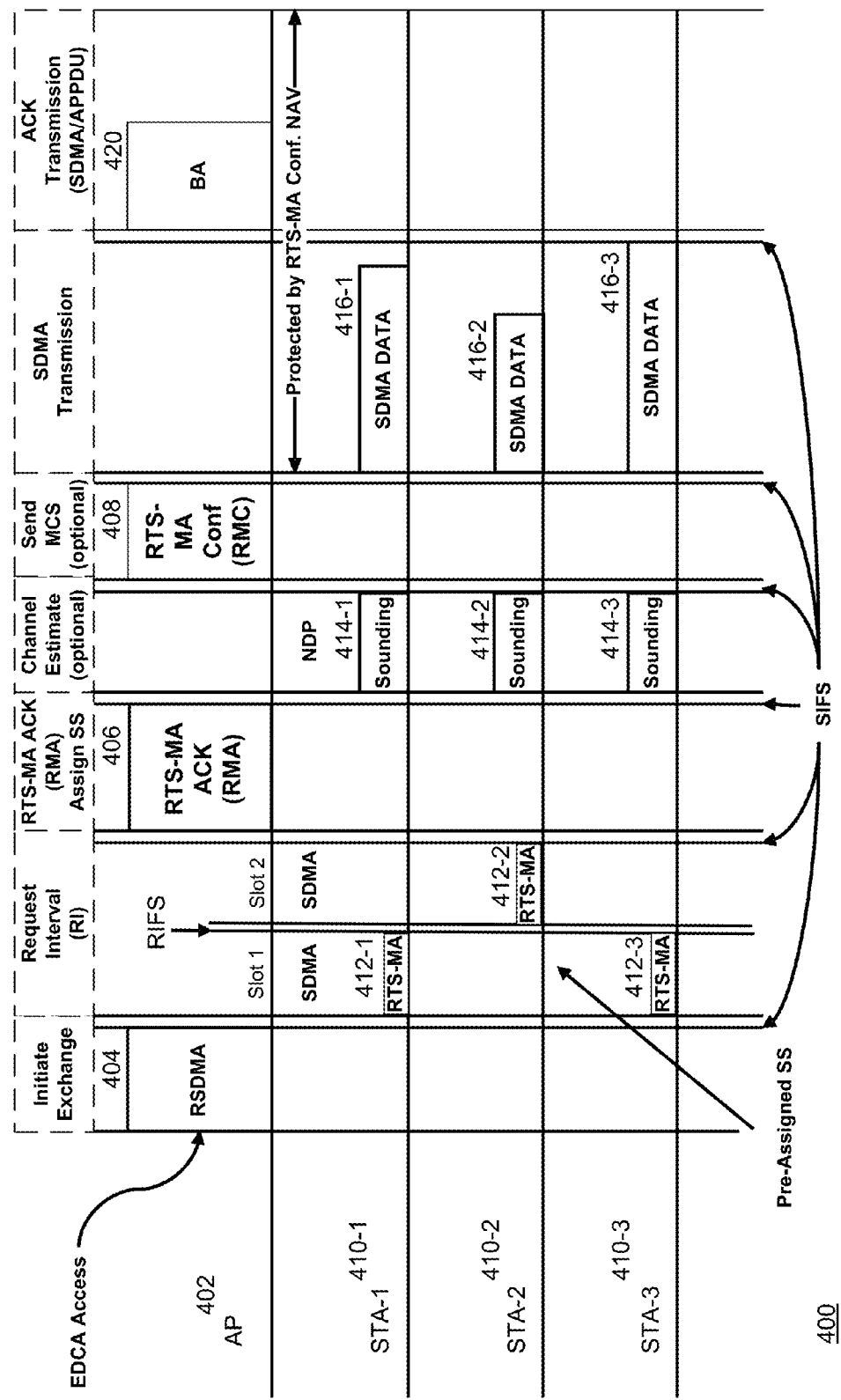
FIG. 4 is a block diagram illustrating the operation of a traditional Access Point (AP)-initiated UL SDMA frame sequence.

FIG. 4 illustrates a timing diagram 400 that illustrates a traditional sequence for AP-initiated uplink SDMA transmission by an AP 402 with a plurality of STAs 410-1 to 410-3, where:

1. The AP 402 gains access to the medium using EDCA. Access is provided based on a priority depending on a UL traffic Access category (AC) from the plurality of STAs 410-1 to 410-3.

2. The AP 402 sends out a request SDMA (RSDMA) message 404, requesting clients such as the plurality of STAs 410-1 to 410-3 to send an UL request to send-Multiple Access (RTS-MA) message. UL RTS-MA messages are transmitted using pre-assigned time-slots and spatial streams (SS), where the assignment is performed by the AP 402.

3. The plurality of STAs 410-1 to 410-3 respond with respective RTS-MA messages 412-1 to 412-3. Each RTS-MA message contains UL traffic AC, an EDCA back off counter value and a packet size.

4. The AP 402 may optionally send an RTS-MA-ACK (RMA) message 406, acknowledging the RTS-MA messages 412-1 to 412-3 and requesting sounding for UL SDMA modulation and coding scheme (MCS) calculation purposes.

5. The AP 402 then sends an RTS-MA Confirmation (RMC) message 408 with SS, MCS and any power offset values required for UL SDMA for selected clients. These clients are selected to preserve their EDCA priorities (back off counter value and AC). The RMC message 408 also reserves the medium for a time period needed to perform a transmission operation, referred to as a TxOP duration. The TxOP duration can be based on a longest packet size requested by the selected clients.

6. Clients then send UL SDMA packets; illustrated as SDMA data transmissions 416-1 to 416-3, using the SS, MCS and power offset values as suggested by the AP 402.

7. Once the AP 402 has successfully received the UL SDMA packets, the AP 402 responds with a Block ACK (BA) message 420 to acknowledge the transmission from the clients.

8. After a successful transmission of the UL SDMA packets, the clients may re-initialize their back off counters for EDCA access. The clients may prefer to not use EDCA access for UL traffic and rely on scheduled RSDMA or RTS-MA-Confirmation messages for future UL transmissions.

The protocol defines the operation necessary for the AP and STAs to set up a UL-SDMA communication. In a client-initiated transmission process, the AP is not aware of the buffer status of the STAs and consequently, the AP does not know which of the STAs need to send data. To address this, the STAs may each send a Transmit Request (TXR) message to the AP whenever they need to send data. The AP may grant transmission by transmitting a Transmit grant (TXS) message.

In one aspect of the disclosure, the AP may grant the transmission right away to a first STA by sending the TXS message as soon as the TXR is received. In this "immediate reply" approach, after the AP receives a TXR from the first STA, the AP will send a TXS right away. This allows the first STA to transmit data, but because the UL-SDMA protocol is more efficient if the maximum number of spatial streams is multiplexed in a similar transmission, various mechanisms may be used to allow other STAs access to the medium. In one approach, the AP may be informed that a STA has data to transmit for future uplink SDMA session by having the STA itself piggyback such information during a previous UL-SDMA transmission. The allocation of resources may also be based on a scheduling algorithm, where the AP will pre-schedule STAs based on known classifications or other categorization of STAs. By way of example, if one of the STAs has time sensitive traffic such as Voice Over IP (VoIP) traffic, then the AP will schedule the STA with resources accordingly.

In another aspect of the disclosure, the AP may simply acknowledge the request and wait to collect other requests before granting the transmission right away. In this "delayed reply" approach, requests are collected from several STAs such that the maximum number of spatial streams is multiplexed in a similar transmission. Further, a STA that has received an acknowledgment may wait for a timeout. The immediate reply and the delayed reply approaches are described further herein.

The STAs have to decide when to request a transmission. In one aspect of the disclosure, an IEEE 802.11 Enhanced Distributed Channel Access (EDCA) mechanism is implemented by the STAs. The EDCA mechanism currently provides access priority based on traffic type. To optimize operation efficiency, a STA may be prevented from sending TXRs unless the STA has enough data to amortize any fixed overhead needed to transmit the data. By way of example, for each transmission operation, the resources for transmitting a preamble, deferral times, etc. are incurred. Thus, unless there is enough data to warrant this expenditure of resources, a STA will be prevented from requesting transmission. It should be noted that there are latency, buffer or other similar considerations that need to be accounted. Thus, by way of example, thresholds may be implemented so that a STA will send a request for transmission to the AP when a latency or buffer threshold has been reached. In one aspect of the disclosure, the thresholds may be static and based on class or network type/capabilities. In another aspect of the disclosure, the thresholds may be dynamic, where the AP can set the thresholds based on network load. In yet another aspect of the disclosure, a combination of static and dynamic thresholds may also be implemented.

Figure 5:
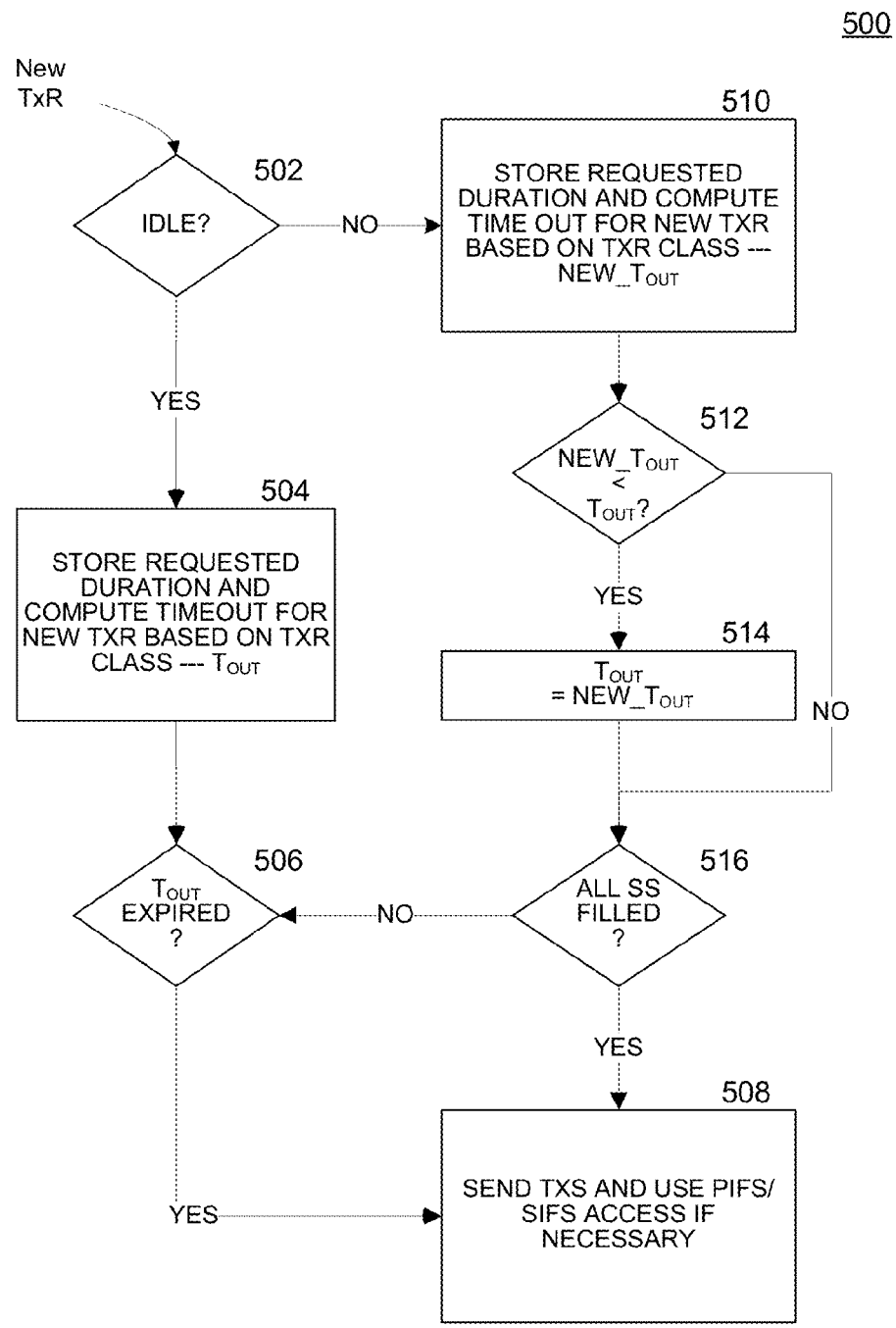
FIG. 5 is a flow diagram illustrating the operation of a station (STA)/client-initiated UL SDMA scheme configured in accordance with one aspect of the disclosure with an AP delayed reply approach.

As noted above, two operation modes are provided for the AP to decide when to start an UL-SDMA transmission by sending a TXS. Referring to FIG. 5, illustrating a delayed reply process, a timer may be started after the AP receives a request from a STA (TXR). The AP may start an UL_SDMA session as soon as new requests come and the number of requested spatial stream fully uses the available ones, or the timer expires. Timer durations may be different based on the class. In the assignment of spatial streams and resources for other STAs, the AP can receive multiple requests and implement a policy for serving the requests in the correct order, while complying with the fairness rules stated by the IEEE 802.11 EDCA mechanism. In one aspect of the disclosure, a simple approach may serve the STAs in the order of the received TXR. This approach respects the fact that STAs were able to access the medium when they sent the request and, in a legacy EDCA protocol, they would also have transmitted their data in that order. This would be referred to as a non-pre-emption approach.

In a second mode of operation, as referred to as the immediate reply approach, the AP always replies to a request with a message granting an uplink transmission. Thus, the AP may send a TXS after every TXR, the TXS granting uplink access for at least the sender of the TXS, and potentially for other STAs. Specifically, such an uplink transmission might involve the requesting STA only or might be an UL-SDMA involving multiple STAs. In the assignment of SS and resources for other STAs, the AP needs to select other STAs to be included in the UL-SDMA. Different mechanisms to select which stations to include in the UL-SDMA may be implemented. One approach is to have the AP include in the UL-SDMA transmission a set of STAs that are candidate to have traffic to send.

Different approaches of selecting the STAs could include: a blind round robin or random selection of STA. Another approach may include after each UL transmission, a STA may signal, such as by setting a bit, that it has more data to transmit and the AP will consider this information when it is selecting the STA. Yet another approach may include use of an independent protocol by the STAs to signal the nature of their traffic to the AP, from which the AP can deduce the STA load.

In one aspect of the disclosure, the maximum number of spatial streams allowed in the UL-SDMA has to be less or equal than the number of receiving antennas at the AP. The AP needs to know the maximum number of spatial streams will be sent by each station. One approach may be to have the AP decide this value for each STA before each resource allocation in order to optimize the resource usage on each UL-SDMA transmission. This approach may be complex and requiring additional information. Another approach is to have the AP and the STA agree, a priori, on the maximum number of spatial streams that a STA will use in any UL-SDMA transmission. This value can be modified periodically by the AP.

A STA may decide how many spatial streams to use, which may be less than the maximum amount that has previously been agreed to. The AP only needs to be ensured that the STA does not exceed a maximum previously determined number of the spatial streams. This may result in unused spatial streams if the STA does not use all spatial streams, but there may be an improvement in the processing time to not have to dynamically assign spatial streams.

Once the AP has selected the STAs for U-SDMA transmission, the AP has to decide the duration of the UL-SDMA transmission. In one aspect of the disclosure, the STA may specify the required duration in their request. The AP will set the duration of the UL-SDMA as a function of the requested time from the scheduled STAs. Request coming from a STA will hold one or more duration fields. Each duration field will specify the requested duration depending on the total number of spatial streams that will be SDMAed together. For example, a single spatial stream STA might require 1 ms if it is served alone, but require more than 1.5 ms if served together with other 2 spatial streams, because in the latter case the STA will have to use a lower MCS. In the case where a single duration is sent, requests might include an MCS indication associated with the duration. The AP will be able to determine the amount of data the STA needs to transmit (MCS×duration) and use such an information to select the duration granted in the TXS. An example of the function may be that the duration is based on the maximum duration contained in the requests that are part of the scheduled requests (i.e., the maximum of the STA requests). For the immediate reply mode, the duration may be based on the TXR of the first STA.

For modulation determination, as described earlier, the number of spatial streams for each STA is fixed but the modulation used by each STA has to be decided. The optimum scheme may be to have the AP collect all the channel information from all the STAs and compute the joint optimum modulation for each STA. This may be complex and requires additional information. Another approach is to have each STA use a rate adaptation algorithm that allows for autonomous modulation selection. An alternative solution is to have the AP decide which MCS is to be used by each STA, where the MCS indication is included in the TXS message. Another alternative solution is to have each STA sends an MCS indication in the TXR and the AP send an MCS backoff indication in the TXS, referring to the received MCS in the TXR.

The TXS may also include, in addition to which STA can transmit, a number of spatial streams that is being assigned to all STAs that will be transmitting. The STAs that are transmitting may then use this information to determine modulation (e.g., a first STA may use a modulation for a lower data rate for a TXS that is allocating a high number of spatial streams for UL SDMA transmission—i.e., the first STA is aware its transmissions will be subject to interference from other STAs that have been granted access).

For UL-SDMA physical layer operation, power control might be required (e.g., the transmit power of each station might need to be changed). One approach is to have the AP store the received power level from each TXR and associate it with the sending STA. The AP may include a per-STA power control information in the TXS, which may allow each station to modify the transmit power. The transmit power may be modified with relative reference to the power used when sending the TXR. The TXR from each STA may be sent at the maximum power that the STA can support.

Before the UL-SDMA session takes place, the AP may specify some parameters the STAs will be using, and communicates them to each STA. The exact number of spatial streams (Nss) or maximum number of spatial streams that will be used by each STA may be less than the NtxSTA for each STA.

As an optional feature, before the UL-SDMA session takes place the, STAs communicate to the AP the nature of their traffic. The communication may indicate the maximum accepted delay in service, or the average requested throughput.

Figure 6:
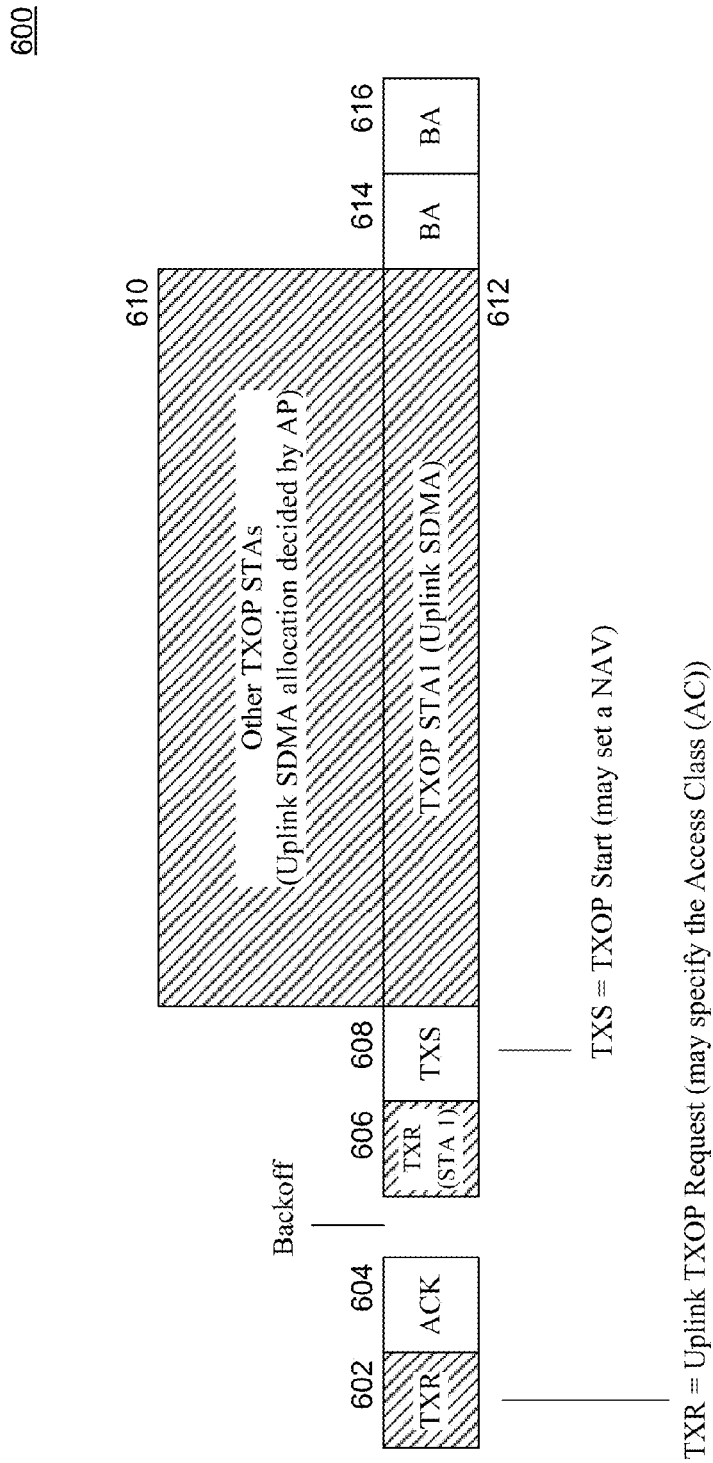
FIG. 6 is a timing diagram illustrating the operation of a station (STA)/client-initiated UL SDMA scheme configured in accordance with one aspect of the disclosure with an AP immediate reply approach.

FIG. 6 illustrates a timing diagram illustrating the operation 600 of a station (STA)/client-initiated UL SDMA scheme configured in accordance with one aspect of the disclosure with an AP immediate reply approach. In one approach of the protocol, as illustrated by 602, each STA having data to transmit towards the AP sends a TXR and access to the medium is obtained through legacy EDCA operations. EDCA provides different classes of traffic and defines different access rules per class. The TXR may carry a class of data to be transmitted. The TXR may also include TxTime, which is the time required for the transmission. In other words, each request from a STA will include an indication of one or more requested durations, where each duration is referred to as a possible SDMA transmission setting, such as the total number of spatial streams. Each request from a STA may also include an MCS indication, referring to the MCS that the STA will be using in relation with the requested transmission duration. From the duration and the requested MCS, the AP may determine the amount of data the STA needs to send.

In one aspect of the disclosure, the STAs sending a TXR and receiving an acknowledgment are not allowed to send another TXR for the same class of data, unless some conditions are fulfilled. For example, a STA may send another TXR if a timeout expires without the STA receiving a TXS with its address in the TXS list. In another example, the STA may send another TXR if Quality of Service (QoS) requirements allows for sending additional TXRs.

As illustrated by 604, upon receiving a TXR, the AP may reply immediately with a simple Acknowledgement (ACK). In one aspect of the disclosure, the ACK may be sent after a SIFS time as defined by the IEEE 802.11 standard. The AP may store, in a location such as in a local memory, the request for future use by also saving information such as the class of the request, the TxTime, the time at which the request was received, the power at which the request was received, and the MCS.

In another aspect of the disclosure, the AP may reply immediately after a SIFS time as defined in the IEEE 802.11 standard with a Transmit Send (TXS) message, as illustrated by 608. The TXS message may carry a list of STAs allowed to transmit data in the following UL-SDMA; the maximum duration of the data transmission (TxTime); the power level adjustment for each STA, which may be defined based on the stored power from the received TXR; and the total number of spatial streams allocated, which may be useful for a rate adaptation algorithm. The TXS message may also optionally include a time offset to correct packet transmission start time, as well as an MCS indication per STA or an MCS backoff indication per STA.

The list of STAs allowed to transmit data in the UL-SDMA may be derived by several methods, depending on the available information. In one example of creating the list of STAs, the STAs may be selected in the chronological order of the respective TXR reception time. In this example, the STA may be added to the list until the sum of Nss for each STA reaches a number that would not allow adding any other STA that made a request. As further described herein, the AP considers a STA as a candidate to be in listed in a TXS only as long as the STA ID is stored in the AP's memory. In one approach, a STA that was not listed in a given TXS will be listed in at least one of a subsequent TXS. In another approach, a STA that was listed in a given TXS, but from which the AP did not receive a correct packet, will be listed in at least one of a subsequent TXS, up to either a maximum number of retries is reached or a timeout expires.

In another example of creating the list of STAs, the STA is selected from a list of candidates based on the available information. One method includes a blind round robin selection of stations. In this method, after each UL transmission, a STA signal with a bit, that it has more data to transmit. The AP will consider this information when selecting the STAs. In an independent protocol, STAs may signal to the AP of the nature of their traffic, from which the AP can deduce the STA load and have selection procedure which accounts for that.

In yet another example of creating the list of STAs, the AP may include a STA that sent the TXR that triggered the TXS. This is not strictly necessary but would make the operation more similar to a legacy IEEE 802.11 operation.

As noted above, the TXS may include a maximum duration of the data transmission, TxTime. In one aspect of the disclosure, the duration of the TxTime is set as a function of the duration of the TxTime specified in the TXR messages of the stations specified in the list of STAs. For example, the TxTime may be set as the maximum TxTime from the received TXRs. Another example approach is that the TXTime may be set as the TxTime in the last TXR, which matches the behavior of a legacy EDCA protocol.

In one aspect of the disclosure, the AP considers a STA as a candidate to be listed in a TXS as long as the STA ID is stored in its local memory. Thus, in one aspect of the disclosure, the AP may remove a STA from the local memory after certain events. For example, the STA may be removed once the AP receives an ACK from the STA. The STA may also be removed if the AP does not receive a correct packet from the STA following a consecutive maximum retransmission number of TXSs listing that STA in the list of STAs.

Upon receiving the TXS, a STA may check to determine if its address is listed in the TXS. If it is not listed, then the STA may not be allowed to transmit for a duration of TxTime, which it extracts from the TXS.

If the STA is listed in the TXS, then if the STA has data to transmit and can transmit according to the medium access rules, the STA extracts the TxTime duration from TXS and proceeds to transmit a data packet with a duration less or equal to TxTime in a TXOP, as illustrated by 610/612. In one aspect of the disclosure, a transmission may start immediately after a SIFS time as defined in the IEEE 802.11 standard and the STA uses the number of spatial streams agreed with the AP (Nss), and independently selects the modulation to be used. The training fields in the packet preamble are modulated according to the indexing defined by the ordering of the stations in the TXS. Optionally, the STA may add a bit indicating whether it has more data available to be transmitted in a future uplink transmission. The bit indicates that the STA would like to be considered for the next UL-SDMA without sending an explicit TXR. Even if the STA does not have data to transmit, the STA may send a control message to inform the AP that it does not have data to transmit. Otherwise, the AP may assume that the STA did not hear the TXS and consequently reschedule it in the next UL-SDMA, which may cause inefficiency.

Upon receiving the data from all the STAs, the AP may send immediately, after the SIFS time as defined in the IEEE 802.11 standard, an acknowledgment to each station for which the data was received successfully, as illustrated by block ACKs 614/616. The acknowledgment to multiple STAs may be sent according to different mechanisms. By way of example and not limitation, the acknowledgement may be sent using SDMA, TDMA, or AMPDU.

Figure 7:
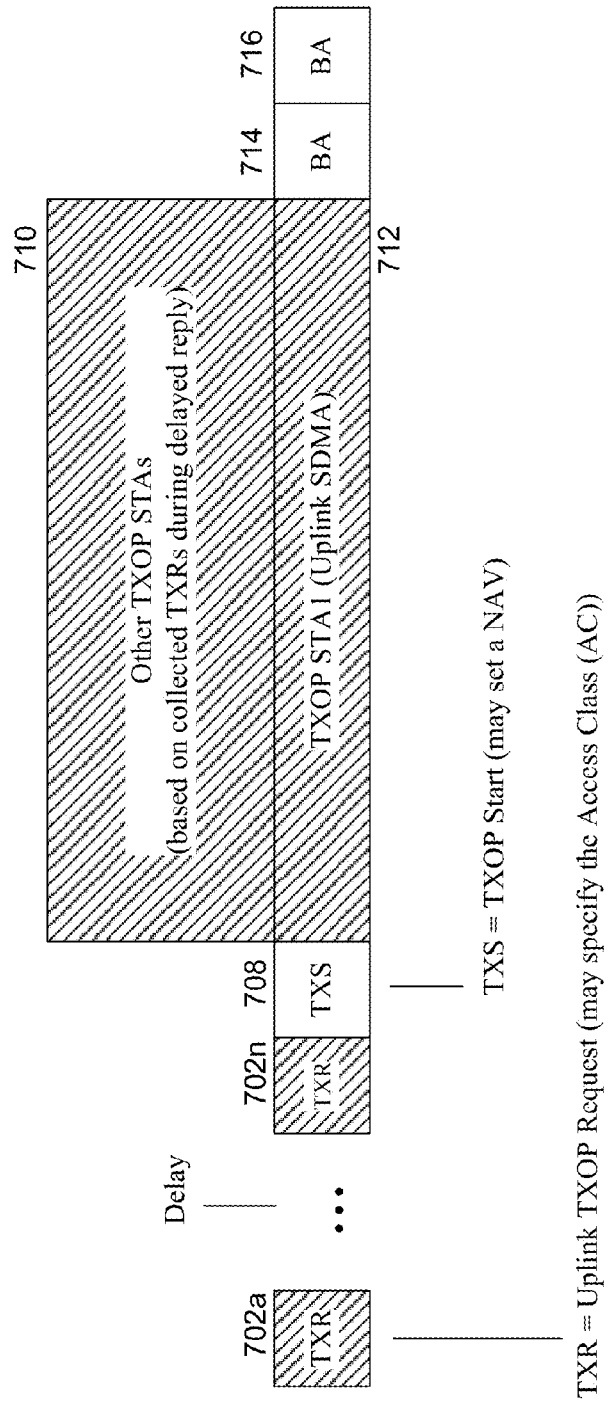
FIG. 7 is a timing diagram illustrating the operation of a station (STA)/client-initiated UL SDMA scheme configured in accordance with one aspect of the disclosure with an AP delayed reply approach.

FIG. 7 illustrates a timing diagram illustrating the operation 700 of a station (STA)/client-initiated UL SDMA scheme configured in accordance with one aspect of the disclosure with an AP delayed reply approach. As a different operation mode, the AP may be allowed to autonomously send a TXS message, which is not a response to a TXR, as illustrated by 708. In one aspect of the disclosure, operations following the TXS are the same as described previously, where the TXS was a reply to a TXR. Each class of data is associated with a timeout duration, which can be different based on the class. Upon receiving a TXR with a particular class, the timer expiration time may be set to a current time plus the duration of the timeout as specified for the class if no timer is already running. If a timer is already running, the timer expiration time may be set to the minimum of the current expiration time and the current time plus the duration associated with the class.

Furthermore, in one aspect of the disclosure, the timer expires whenever the AP receives enough TXRs, as illustrated by 702a-702b, such that the sum of the Nss associated with the sender stations, with each STA counted once, reaches a number such that no additional STAs would be allowed in the UL-SDMA.

In one aspect of the disclosure, the AP sends the TXS at the timer expiration, again as illustrated by 708. As an alternative mode of operation, after the timer expiration the AP may wait for receiving a further request before sending the TXS.

As illustrated by 710/712, the STA that receives an uplink TXOP through a TXS without sending a contended TXR first (i.e., a STA that receives a preemptive/unsolicited TXOP) continues its back off without changes (i.e., the back off that it was counting down in order to transmit the TXR does not get affected by the unsolicited TXOP). The alternative is that the pending back off for transmitting the TXR is truncated and restarted after receiving an unsolicited TXOP, but this would reduce the access priority of the STA. It is possible to restart the back off if there needs to be benefit to legacy STAs in the network (i.e., this is a policy decision).

To indicate that further traffic is pending after the current uplink TXOP, a STA may aggregate a TXR MPDU in the uplink A-MPDU. The STA still has to keep contending to send a separate contended TXR, in order to provide the AP with opportunities to grant uplink TXOPs by sending a TXR. Piggybacking TXOP requests on uplink A-MPDUs in combination with also sending contended TXRs to provide the AP with TXOPs is one approach.

If the AP has received the transmissions, then the AP will send out block ACKs 714/716. Specifically, upon receiving the data from all the STAs, the AP may send immediately, after the SIFS time as defined in the IEEE 802.11 standard, an acknowledgment to each station for which the data was received successfully. As noted previously, the acknowledgment to multiple STAs may be sent according to different mechanisms. By way of example and not limitation, the acknowledgement may be sent using SDMA, TDMA, or AMPDU.

Figure 8:
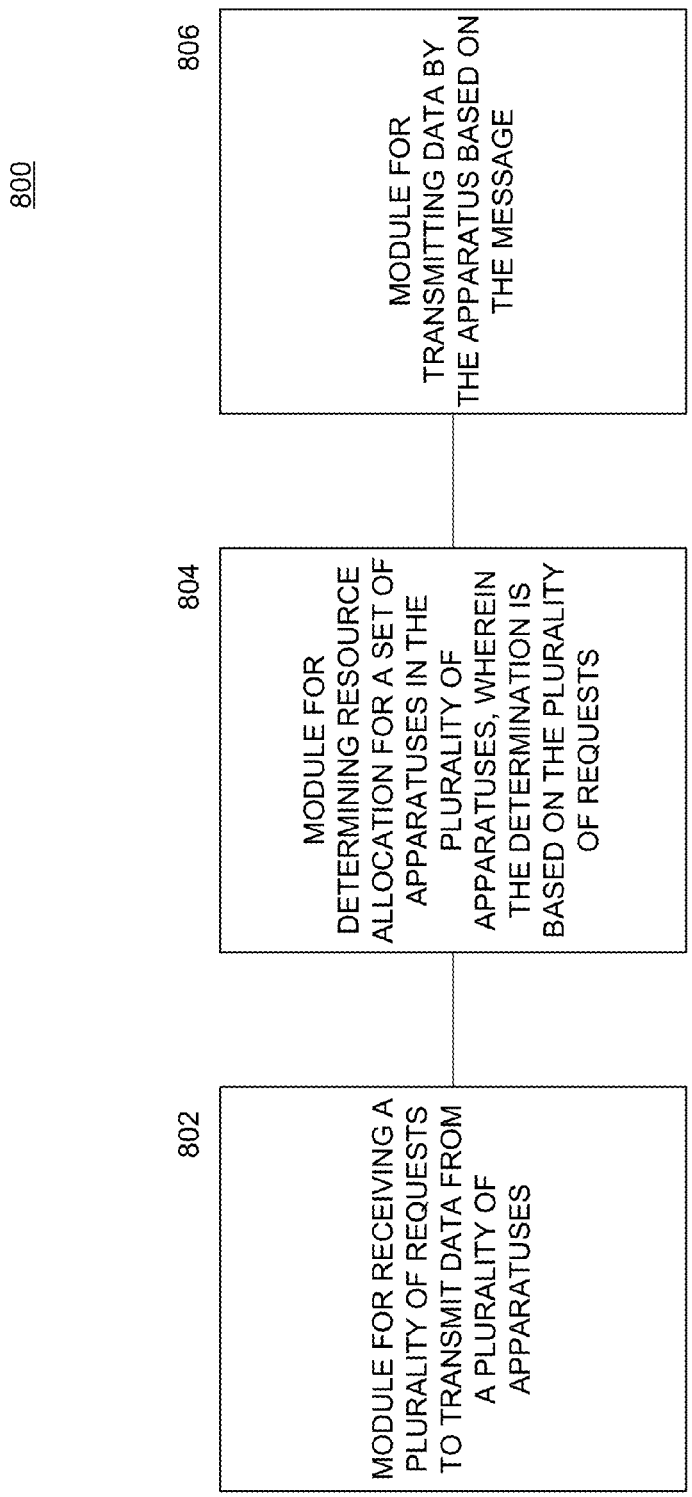
FIG. 8 is a block diagram illustrating the functionality of an access point apparatus for implementing a client-initiated UL scheme with a plurality of STAs in accordance with one aspect of the disclosure.

FIG. 8 is a diagram illustrating the functionality of an access point apparatus 800 in accordance with one aspect of the disclosure. The apparatus 800 includes a module 802 for receiving a plurality of requests to transmit data from a plurality of apparatuses; a module 804 for determining resource allocation for a set of apparatuses in the plurality of apparatuses, wherein the determination is based on the plurality of requests; and a module 806 for transmitting a message comprising the resource allocation to the set of apparatuses to permit data transmission.

Figure 9:
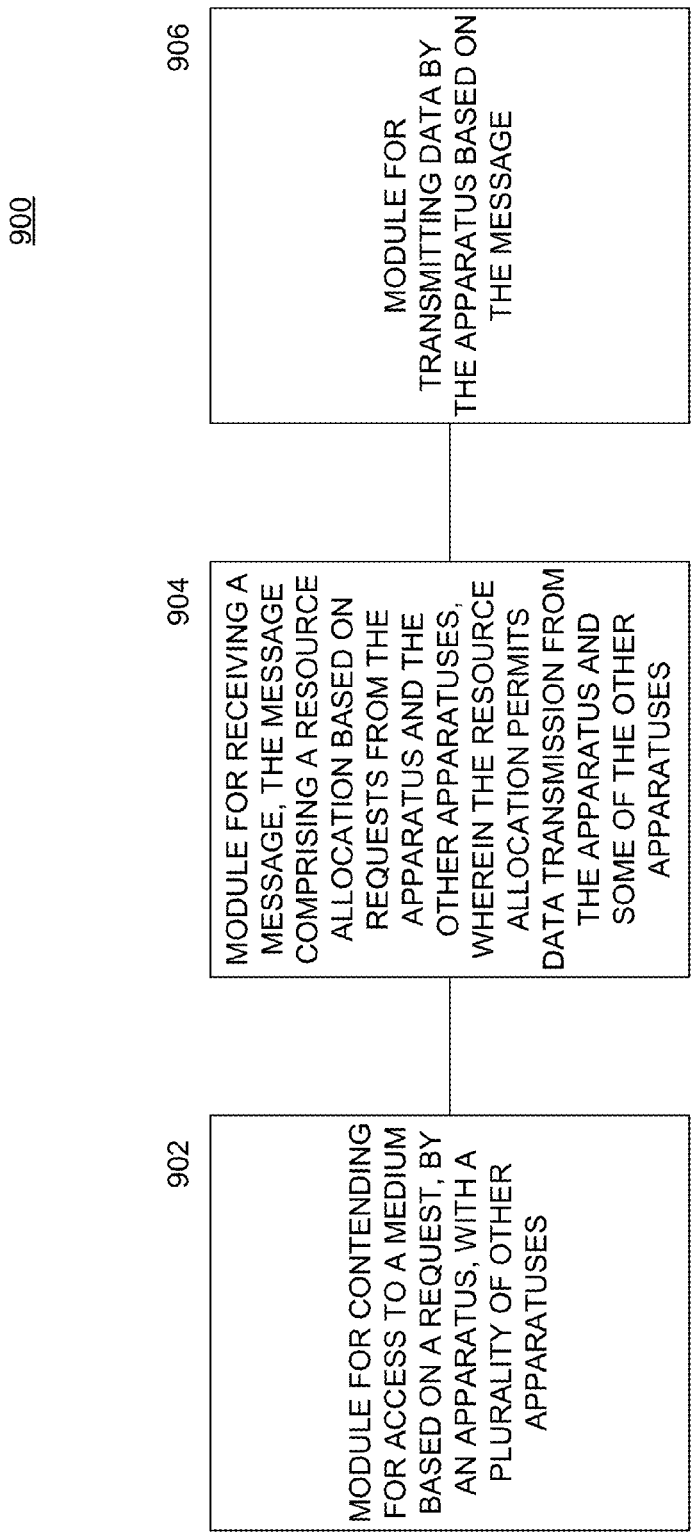
FIG. 9 is a block diagram illustrating the functionality of a STA apparatus for implementing a client-initiated UL scheme for a plurality of STAs in accordance with one aspect of the disclosure.

FIG. 9 is a diagram illustrating the functionality of an STA apparatus 900 in accordance with one aspect of the disclosure. The apparatus 900 includes a module 902 contending for access to a medium based on a request, by an apparatus, with a plurality of other apparatuses; a module 904 for receiving a message, the message comprising a resource allocation based on requests from the apparatus and the other apparatuses, wherein the resource allocation permits data transmission from the apparatus and some of the other apparatuses; and a module 906 for transmitting data by the apparatus based on the message.

The processing system described herein, or any part of the processing system, may provide the means for performing the functions recited herein. By way of example, the processing system executing code may provide the means for receiving a plurality of requests to transmit data from a plurality of apparatuses; means for determining resource allocation for a set of apparatuses in the plurality of apparatuses, wherein the determination is based on the plurality of requests; and means for transmitting a message comprising the resource allocation to the set of apparatuses to permit data transmission. By way of another example, the processing system executing code may provide the means for contending for access to a medium based on a request, by an apparatus, with a plurality of other apparatuses; receiving a message, the message comprising a resource allocation based on requests from the apparatus and the other apparatuses, wherein the resource allocation permits data transmission from the apparatus and some of the other apparatuses; and transmitting data by the apparatus based on the message. Alternatively, the code on the computer-readable medium may provide the means for performing the functions recited herein.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

Those skilled in the art will recognize how best to implement the described functionality presented throughout this disclosure depending on the particular application and the overall design constraints imposed on the overall system.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
   contending for access to a medium based on a request, by an apparatus, with a plurality of other apparatuses, wherein the contention comprises:
      determining a characteristic of data to be transmitted, and
      transmitting a request for resource allocation to the medium if the characteristic satisfies a threshold, and the method further comprises:
   receiving a message, the message comprising a resource allocation based on requests from the apparatus and the other apparatuses, wherein the resource allocation permits data transmission from the apparatus and some of the other apparatuses; and
   transmitting the data by the apparatus based on the message.

2. The method of claim 1, wherein transmissions of at least two of the requests from the apparatus and the other apparatuses overlap.

3. The method of claim 1, wherein the transmission of data from the apparatus and at least one of the other apparatuses start substantially simultaneously.

4. The method of claim 1, wherein the characteristic is an amount of the data to be transmitted.

5. The method of claim 1, wherein the characteristic is a priority of the data to be transmitted.

6. The method of claim 1, wherein the characteristic is a transmission duration of the data to be transmitted.

7. The method of claim 1, wherein the data transmission comprises transmitting data on a number of spatial streams based on a spatial stream allocation and a spatial stream index of the resource allocation.

8. The method of claim 1, wherein the data transmission comprises transmitting data based on an MCS specified in the resource allocation.

9. The method of claim 1, wherein the data transmission comprises transmitting data at a power level based on a power level adjustment in the resource allocation.

10. The method of claim 1, wherein the data transmission comprises transmitting data selected based on a class of data in the resource allocation.

11. The method of claim 1, wherein the data transmission comprises an indication of further data waiting to be transmitted, wherein the further data comprises data that is other than the data being transmitted currently.

12. The method of claim 11, wherein the indication comprises at least one of the following: an amount of data, a duration of data, or a priority of the data.

13. The method of claim 1, wherein each request in the plurality of requests comprises a transmission duration, and wherein the resource allocation comprises a transmission duration grant based on the transmission duration of each request.

14. The method of claim 1, wherein each request in the plurality of requests is transmitted at a respective power level, and wherein the resource allocation comprises a power level adjustment based on the respective transmitted power levels.

15. The method of claim 1, wherein the data transmission comprises transmitting data using a modulation scheme based on a rate adaption algorithm.

16. The method of claim 1, further comprising transmitting an indication of data to be transmitted in an alternative communication.

17. The method of claim 16, wherein the alternative communication comprises a message previously received.

18. The method of claim 16, wherein the indication comprises an indication that no data is available for transmission.

19. The method of claim 1, further comprising receiving a block acknowledgement based on the transmission of data.

20. The method of claim 19, wherein the message comprises a transmission duration time and wherein the method further comprising waiting for the block acknowledgment for a period of time that is based on the transmission duration time.

21. The method of claim 1, wherein the resource allocation in the message comprise a plurality of parameters for the apparatus and at least one of the other apparatuses comprising at least one of:
   a MCS value;
   a number of spatial streams;
   spatial stream index or indices;
   a power level adjustment; or
   a class of data.

22. A method for wireless communications comprising:
   contending for access to a medium based on a request, by an apparatus, with a plurality of other apparatuses;
   receiving a message, the message comprising a resource allocation based on requests from the apparatus and the other apparatuses, wherein the resource allocation permits data transmission from the apparatus and some of the other apparatuses; and
   transmitting data by the apparatus based on the message, wherein
   the contention for medium access comprises a back off process, and
   the request is associated with a first class of data, the method further comprising stopping the back off process for the first class of data until determining at least one of receiving the message or reaching a time out, wherein the back off process is interrupted after receiving an acknowledgment for the request.

23. The method of claim 22, wherein the apparatus is not permitted to send another request of the first class unless: (i) the apparatus receives an allocation corresponding to the request; (ii) the first class is associated with a class of data that requires periodic transmission; or (iii) a time out is reached.

24. The method of claim 22, wherein the apparatus is permitted to send a second request after the request, wherein the second request being associated with a second class according to a contention algorithm associated with the second class.

25. The method of claim 22, wherein the apparatus, subsequent to transmitting data in accordance with the received message and receiving the acknowledgment for the data, resumes the back off process with a new back off count prior to sending a second request.

26. The method of claim 25, where the new back off count is based on a random number.

27. The method of claim 25, wherein the new back off count is received from an access point.

28. A method for wireless communications comprising:
   contending for access to a medium based on a request, by an apparatus, with a plurality of other apparatuses;
   receiving a message, the message comprising a resource allocation based on requests from the apparatus and the other apparatuses, wherein the resource allocation permits data transmission from the apparatus and some of the other apparatuses; and transmitting data by the apparatus based on the message, wherein the contention for medium access comprises a back off process, and the request is associated with a first class, the method further comprising:

receiving an unsolicited message;

transmitting data in accordance with the unsolicited message before expiration of the back off process;

interrupting the back off process for the first class; and transmitting data in accordance with the unsolicited message.

29. The method of claim 28, wherein the interruption of the back off process comprises stopping a back off count, and the method further comprises resetting the back off count based on a random number.

30. The method of claim 28, wherein the interruption of the back off process comprises suspending a back off count, and the method further comprises resuming the back off count.

31. The method of claim 28, further comprising resuming, subsequent to a transmission of data in accordance with the unsolicited message and receiving an acknowledgment for the data, the back off process to transmit another request associated with the first class.

32. An apparatus for wireless communications comprising:

a circuit configured to contend for access to a medium based on a request, by the apparatus, with a plurality of other apparatuses;

a receiver configured to receive a message, the message comprising a resource allocation based on requests from the apparatus and the other apparatuses, wherein the resource allocation permits data transmission from the apparatus and some of the other apparatuses; and a transmitter configured to transmit data by the apparatus based on the message, wherein the circuit is further configured to determine a characteristic of the data to be transmitted, and the transmitter is further configured to transmit a request for resource allocation to the medium if the characteristic satisfies a threshold.

33. The apparatus of claim 32, wherein transmissions of at least two of the requests from the apparatus and the other apparatuses overlap.

34. The apparatus of claim 32, wherein the transmission of data from the apparatus and at least one of the other apparatuses start substantially simultaneously.

35. The apparatus of claim 32, wherein the characteristic is an amount of the data to be transmitted.

36. The apparatus of claim 32, wherein the characteristic is a priority of the data to be transmitted.

37. The apparatus of claim 32, wherein the characteristic is a transmission duration of the data to be transmitted.

38. The apparatus of claim 32, wherein the transmitter is further configured to transmit data on a number of spatial streams based on a spatial stream allocation and a spatial stream index of the resource allocation.

39. The apparatus of claim 32, wherein the transmitter is further configured to transmit data based on an MCS specified in the resource allocation.

40. The apparatus of claim 32, wherein the transmitter is further configured to transmit data at a power level based on a power level adjustment in the resource allocation.

41. The apparatus of claim 32, wherein the transmitter is further configured to transmit data selected based on a class of data in the resource allocation.

42. The apparatus of claim 32, wherein the data transmission comprises an indication of further data waiting to be transmitted, wherein the further data comprises data that is other than the data being transmitted currently.

43. The apparatus of claim 42, wherein the indication comprises at least one of the following: an amount of data, a duration of data, or a priority of the data.

44. The apparatus of claim 32, wherein each request in the plurality of requests comprises a transmission duration, and wherein the resource allocation comprises a transmission duration grant based on the transmission duration of each request.

45. The apparatus of claim 32, wherein each request in the plurality of requests is transmitted at a respective power level, and wherein the resource allocation comprises a power level adjustment based on the respective transmitted power levels.

46. The apparatus of claim 32, wherein the data transmission comprises transmitting data using a modulation scheme based on a rate adaption algorithm.

47. The apparatus of claim 32, the transmitter is further configured to transmit an indication of data to be transmitted in an alternative communication.

48. The apparatus of claim 47, wherein the alternative communication comprises a message previously received.

49. The apparatus of claim 47, wherein the indication comprises an indication that no data is available for transmission.

50. The apparatus of claim 32, the receiver is further configured to receive a block acknowledgement based on the transmission of data.

51. The apparatus of claim 50, wherein the message comprises a transmission duration time and wherein the circuit is further configured to wait for the block acknowledgment for a period of time that is based on the transmission duration time.

52. The apparatus of claim 32, wherein the resource allocation in the message comprise a plurality of parameters for the apparatus and at least one of the other apparatuses comprising at least one of:

a MCS value;

a number of spatial streams;

spatial stream index or indices;

a power level adjustment; or a class of data.

53. The apparatus of claim 32, wherein the contention for medium access comprises a back off process.

54. The apparatus of claim 52, wherein the request is associated with a first class of data, the circuit is further configured to stop the back off process for the first class of data until determining at least one of receiving the message or reaching a time out, wherein the back off process is stopped after receiving an acknowledgment for the request.

55. The apparatus of claim 54, wherein the apparatus is not permitted to send another request of the first class unless: (i) the apparatus receives an allocation corresponding to the request; (ii) the first class is associated with a class of data that requires periodic transmission; or (iii) a time out is reached.

56. The apparatus of claim 54, wherein the apparatus is permitted to send a second request after the request, wherein the second request being associated with a second class according to a contention algorithm associated with the second class.

57. The apparatus of claim 55, wherein the apparatus, subsequent to transmitting data in accordance with the received message and receiving the acknowledgment for the data, resumes the back off process with a new back off count prior to sending a second request.

58. The apparatus of claim 57, wherein the new back off count is based on a random number.

59. The apparatus of claim 57, wherein message comprises the new back off count.

60. The apparatus of claim 52, the receiver is further configured to receive an unsolicited message; and the transmitter is further configured to transmit data in accordance with the unsolicited message before expiration of the back off process.

61. The apparatus of claim 60, wherein the request is associated with a first class, the circuit is further configured to interrupt the back off process for the first class; and the transmitter is further configured to transmit data in accordance with the unsolicited message.

62. The apparatus of claim 61, wherein the interruption of the back off process comprises stopping a back off count, the circuit is further configured to reset the back off count based on a random number.

63. The apparatus of claim 61, wherein the interruption of the back off process comprises suspending a back off count, the circuit is further configured to resume the back off count.

64. The apparatus of claim 61, wherein the circuit is further configured to resume, subsequent to a transmission of data in accordance with the unsolicited message and receiving an acknowledgment for the data, the back off process to transmit another request associated with the first class.

65. An apparatus for wireless communications comprising:
means for contending for access to a medium based on a request, by an apparatus, with a plurality of other apparatuses;
means receiving a message, the message comprising a resource allocation based on requests from the apparatus and the other apparatuses, wherein the resource allocation permits data transmission from the apparatus and some of the other apparatuses; and
means for transmitting data by the apparatus based on the message, wherein the contention means comprises:
means for determining a characteristic of the data to be transmitted, and
means for transmitting a request for resource allocation to the medium if the characteristic satisfies a threshold.

66. The apparatus of claim 65, wherein transmissions of at least two of the requests from the apparatus and the other apparatuses overlap.

67. The apparatus of claim 65, wherein the transmission of data from the apparatus and at least one of the other apparatuses start substantially simultaneously.

68. The apparatus of claim 65, wherein the characteristic is an amount of the data to be transmitted.

69. The apparatus of claim 65, wherein the characteristic is a priority of the data to be transmitted.

70. The apparatus of claim 65, wherein the characteristic is a transmission duration of the data to be transmitted.

71. The apparatus of claim 65, wherein the data transmission means comprises means for transmitting data on a number of spatial streams based on a spatial stream allocation and a spatial stream index of the resource allocation.

72. The apparatus of claim 65, wherein the data transmission means comprises means for transmitting data based on an MCS specified in the resource allocation.

73. The apparatus of claim 65, wherein the data transmission means comprises means for transmitting data at a power level based on a power level adjustment in the resource allocation.

74. The apparatus of claim 65, wherein the data transmission means comprises means for transmitting data selected based on a class of data in the resource allocation.

75. The apparatus of claim 65, wherein the data transmission comprises an indication of further data waiting to be transmitted, wherein the further data comprises data that is other than the data being transmitted currently.

76. The apparatus of claim 75, wherein the indication comprises at least one of the following: an amount of data, a duration of data, or a priority of the data.

77. The apparatus of claim 65, wherein each request in the plurality of requests comprises a transmission duration, and wherein the resource allocation comprises a transmission duration grant based on the transmission duration of each request.

78. The apparatus of claim 65, wherein each request in the plurality of requests is transmitted at a respective power level, and wherein the resource allocation comprises a power level adjustment based on the respective transmitted power levels.

79. The apparatus of claim 65, wherein the data transmission means comprises means for transmitting data using a modulation scheme based on a rate adaption algorithm.

80. The apparatus of claim 65, further comprising means for transmitting an indication of data to be transmitted in an alternative communication.

81. The apparatus of claim 80, wherein the alternative communication comprises a message previously received.

82. The apparatus of claim 80, wherein the indication comprises an indication that no data is available for transmission.

83. The apparatus of claim 65, further comprising means for receiving a block acknowledgement based on the transmission of data.

84. The apparatus of claim 83, wherein the message comprises a transmission duration time and further comprising means for waiting for the block acknowledgment for a period of time that is based on the transmission duration time.

85. The apparatus of claim 65, wherein the resource allocation in the message comprise a plurality of parameters for the apparatus and at least one of the other apparatuses comprising at least one of:
a MCS value;
a number of spatial streams;
spatial stream index or indices;
a power level adjustment; or
a class of data.

86. An apparatus for wireless communications comprising:
means for contending for access to a medium based on a request, by an apparatus, with a plurality of other apparatuses;
means receiving a message, the message comprising a resource allocation based on requests from the apparatus and the other apparatuses, wherein the resource allocation permits data transmission from the apparatus and some of the other apparatuses; and
means for transmitting data by the apparatus based on the message, wherein
the contention for medium access comprises a back off process, and
the request is associated with a first class of data, further comprising means for stopping the back off process for the first class of data until determining at least one of receiving the message or reaching a time out, wherein the back off process is stopped after receiving an acknowledgment for the request.

87. The apparatus of claim 86, wherein the apparatus is not permitted to send another request of the first class unless: (i) the apparatus receives an allocation corresponding to the request; (ii) the first class is associated with a class of data that requires periodic transmission; or (iii) a time out is reached.

88. The apparatus of claim 86, wherein the apparatus is permitted to send a second request after the request, wherein the second request being associated with a second class according to a contention algorithm associated with the second class.

89. The apparatus of claim 86, wherein the apparatus, subsequent to transmitting data in accordance with the received message and receiving the acknowledgment for the data, resumes the back off process with a new back off count prior to sending a second request.

90. The apparatus of claim 89, where the new back off count is based on a random number.

91. The apparatus of claim 89, wherein the new back off count is received from an access point.

92. An apparatus for wireless communications comprising:
means for contending for access to a medium based on a request, by an apparatus, with a plurality of other apparatuses;
means receiving a message, the message comprising a resource allocation based on requests from the apparatus and the other apparatuses, wherein the resource allocation permits data transmission from the apparatus and some of the other apparatuses; and
means for transmitting data by the apparatus based on the message, wherein
the contention for medium access comprises a back off process, and
the request is associated with a first class, the method further comprising:
means for receiving an unsolicited message;
means for transmitting data in accordance with the unsolicited message before expiration of the back off process;
means for interrupting the back off process for the first class; and
means for transmitting data in accordance with the unsolicited message.

93. The apparatus of claim 92, wherein the interruption means of the back off process comprises means for stopping a back off count, and further comprising means for resetting the back off count based on a random number.

94. The apparatus of claim 92, wherein the interruption means of the back off process comprises means for suspending a back off count, and further comprising means for resuming the back off count.

95. The apparatus of claim 92, further comprising means for resuming, subsequent to a transmission of data in accordance with the unsolicited message and receiving an acknowledgment for the data, the back off process to transmit another request associated with the first class.

96. A computer-program product for wireless communications, comprising:
a computer-readable device comprising instructions executable to:
contend for access to a medium based on a request, by an apparatus, with a plurality of other apparatuses, wherein the contention comprises:
determining a characteristic of the data to be transmitted, and
transmitting a request for resource allocation to the medium if the characteristic satisfies a threshold, and the instructions further executable to:
receive a message, the message comprising a resource allocation based on requests from the apparatus and the other apparatuses, wherein the resource allocation permits data transmission from the apparatus and some of the other apparatuses; and
transmit data by the apparatus based on the message.

97. A station, comprising:
an antenna;
a processor, coupled to the antenna, configured to contend for access to a medium based on a request, by an apparatus, with a plurality of other apparatuses;
a receiver configured to receive a message, the message comprising a resource allocation based on requests from the apparatus and the other apparatuses, wherein the resource allocation permits data transmission from the apparatus and some of the other apparatuses; and
a transmitter configured to transmit data by the apparatus based on the message, wherein:
the processor is further configured to determine a characteristic of the data to be transmitted, and
the transmitter is further configured to transmit a request for resource allocation to the medium if the characteristic satisfies a threshold.

* * * * *